(12) United States Patent
Suau et al.

(10) Patent No.: US 10,941,231 B2
(45) Date of Patent: Mar. 9, 2021

(54) METHOD FOR THE SYNTHESIS OF ACRYLIC (CO)POLYMERS FROM OLIGOMERS OF ACRYLIC ACID

(71) Applicant: ARKEMA FRANCE, Colombes (FR)

(72) Inventors: Jean-Marc Suau, Lucenay (FR); Clementine Champagne, Caluire-et-cuire (FR)

(73) Assignee: ARKEMA FRANCE, Colombes (FR)

( * ) Notice: Subject to any disclaimer, the term of this patent is extended or adjusted under 35 U.S.C. 154(b) by 27 days.

(21) Appl. No.: 15/761,586

(22) PCT Filed: Sep. 30, 2016

(86) PCT No.: PCT/FR2016/052502
§ 371 (c)(1),
(2) Date: Mar. 20, 2018

(87) PCT Pub. No.: WO2017/055767
PCT Pub. Date: Apr. 6, 2017

(65) Prior Publication Data
US 2018/0346625 A1   Dec. 6, 2018

(30) Foreign Application Priority Data

Oct. 2, 2015  (FR) .................................... 1559391

(51) Int. Cl.
| | | |
|---|---|---|
| C08F 20/04 | (2006.01) | |
| C08F 20/18 | (2006.01) | |
| C08F 20/28 | (2006.01) | |
| C08F 20/64 | (2006.01) | |
| C08F 220/18 | (2006.01) | |

(52) U.S. Cl.
CPC ............ *C08F 220/18* (2013.01); *C08F 20/28* (2013.01); *C08F 20/04* (2013.01); *C08F 20/18* (2013.01); *C08F 20/64* (2013.01)

(58) Field of Classification Search
None
See application file for complete search history.

(56) References Cited

U.S. PATENT DOCUMENTS

| | | | | |
|---|---|---|---|---|
| 4,359,564 A | * | 11/1982 | Merritt .................... | C08F 20/28 526/260 |
| 2012/0100084 A1 | | 4/2012 | Peter et al. | |
| 2012/0315237 A1 | * | 12/2012 | Angel ...................... | A61Q 5/06 424/70.6 |
| 2014/0112966 A1 | * | 4/2014 | Souzy .................... | A61K 8/068 424/401 |
| 2015/0342858 A1 | * | 12/2015 | Tamareselvy ........... | A61Q 5/02 424/70.12 |

FOREIGN PATENT DOCUMENTS

| | | |
|---|---|---|
| EP | 0 036 294 A2 | 9/1981 |
| WO | 99/31153 A2 | 6/1999 |
| WO | 2014/099512 A2 | 6/2014 |

OTHER PUBLICATIONS

International Search Report dated Nov. 24, 2016, in PCT/FR2016/52502, filed Sep. 30, 2016.

\* cited by examiner

*Primary Examiner* — Richard A Huhn
(74) *Attorney, Agent, or Firm* — Lynn B. Morreale

(57) ABSTRACT

The present invention relates to the synthesis of an associative acrylic (co)polymer by aqueous emulsion radical polymerization. The (co)polymer contains at least one oligomer of acrylic acid represented by the formula (I):

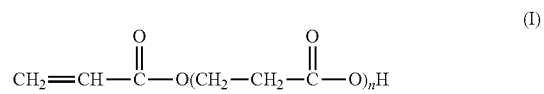

where n is an integer ranging from 1 to 10. The oligomer is prepared from acrylic acid at a temperature of between 50° C. and 200° C. in the presence of a basic or acid catalyst, water, and polymerization inhibitors. The present invention also relates to the associative acrylic (co)polymer obtained from the method and also to the use of this (co)polymer as a thickener in various formulations.

9 Claims, No Drawings

METHOD FOR THE SYNTHESIS OF ACRYLIC (CO)POLYMERS FROM OLIGOMERS OF ACRYLIC ACID

TECHNICAL FIELD

The present invention relates to the synthesis of an acrylic (co)polymer by aqueous emulsion radical polymerization, said (co)polymer comprising at least one oligomer of acrylic acid represented by the formula (I):

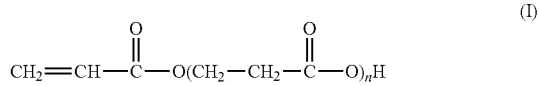

in which n is an integer ranging from 1 to 10,
said oligomer being prepared from acrylic acid at a temperature of between 50° C. and 200° C. in the presence of a basic or acid catalyst, of water and of polymerization inhibitors.

The present invention also relates to the acrylic (co) polymer obtained by the method and also to the use of this (co)polymer as a thickener in various optionally pigmented aqueous formulations.

PRIOR ART

Several prior art documents describe methods for preparing oligomers of acrylic acid. U.S. Pat. No. 4,267,365 in particular describes a method for preparing oligomers of acrylic acid by heating acrylic acid at a temperature of between 50° C. and 200° C. and in the presence of polymerization inhibitors. Such a method does not make it possible to obtain high yields of acrylic acid dimers and trimers.

U.S. Pat. No. 4,359,564, for its part, describes the synthesis of oligomers of acrylic acid used as comonomers in solution or emulsion polymerizations. According to one of the two methods for preparing oligomers of acrylic acid described in this document, the acrylic acid monomers are placed at a temperature of 80° C. for 300 hours in the presence of HydroQuinone Methyl Ether (HQME, polymerization inhibitor), a crown ether and potassium acrylate. The mean degree of acrylic acid oligomerization is about 3. According to the other method described, the acrylic acid monomers are heated for a shorter time (9.5 hours or 20 hours) at a higher temperature (120° C.-125° C.) in the presence of a strongly acidic ion-exchange resin and a mixture of two polymerization inhibitors. Depending on the reaction time, the mean degree of acrylic acid oligomerization is 1.4 or 2. These methods are unsatisfactory insofar as they are either complex to implement or do not make it possible to obtain the desired oligomer product. Document US 2012/100084 describes a mixture comprising acrylic acid, 2-carboxyethyl acrylate and other oligomers. These oligomers are then solution polymerized in n-butanol, but without a polymerization inhibitor being used.

Documents WO 99/31153 and WO 2014/099512 do not describe an associative acrylic polymer comprising at least one mixture of oligomers of acrylic acid and one polymerization inhibitor.

A first object of the present invention is the use of a mixture, for example in the form of an aqueous solution, of oligomers of acrylic acid in aqueous emulsion radical polymerization methods, said mixture comprising a high content of acrylic acid dimers and trimers, for example greater than 20% by weight.

More generally, the synthesis of oligomers of acrylic acid is always performed in the presence of at least one polymerization inhibitor (also known as a "stabilizer"). The contents of these polymerization inhibitors are generally relatively high, which leads to a highly stabilized final product. This is a drawback when the oligomers of acrylic acid must be used in polymerization methods, as (co)monomers.

Thus, another object of the present invention is to propose a mixture, for example in the form of an aqueous solution, of oligomers of acrylic acid which can be used in aqueous emulsion radical polymerization methods, without this giving rise to delayed polymerization or high exothermicity.

The aqueous emulsion radical (co)polymerization method of the present invention uses a mixture of oligomers of acrylic acid prepared according to a specific method which makes it possible to obtain high yields of oligomers of acrylic acid, for example of acrylic acid dimers and trimers, for example greater than 20% by weight, while at the same time limiting the amount of polymerization inhibitors. It has in fact been found that the presence of a small amount of water in combination with a basic or acid catalyst makes it possible to reduce the consumption of polymerization inhibitors in the course of the method for preparing oligomers of acrylic acid. This reduction in polymerization inhibitors consumption makes it possible globally to control the content of inhibitors to be used in the course of the method for producing this mixture of oligomers, and thus to obtain a lower content of inhibitors in the final mixture of oligomers, which is an advantage for the use of this mixture of oligomers in polymerization methods.

BRIEF DESCRIPTION OF THE INVENTION

The present invention relates to a method of aqueous emulsion radical (co)polymerization of at least one mixture of oligomers of acrylic acid represented by the formula (I):

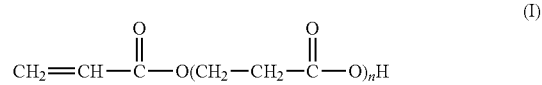

according to which n is an integer of between 1 and 10 (inclusive),
said oligomers being prepared from acrylic acid at a temperature of between 50° C. and 200° C. in the presence of a basic or acid catalyst, of water and of at least one polymerization inhibitor.

According to one embodiment of this method, said mixture of oligomers of acrylic acid contains from 10 ppm to 2,000 ppm of polymerization inhibitors based on the total weight of the mixture.

According to another embodiment of this method, the reaction medium used to prepare the mixture of oligomers contains an amount of water of between 0.01% and 20% by weight based on the total weight of acrylic acid used.

The present invention also relates to an associative acrylic (co)polymer comprising at least one mixture of oligomers of acrylic acid represented by the formula (I):

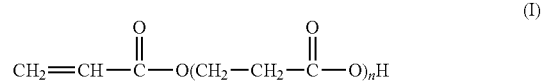

according to which n is an integer of between 1 and 10 (inclusive),
said oligomers being prepared from acrylic acid at a temperature of between 50° C. and 200° C. in the presence of a basic or acid catalyst, of water and of at least one polymerization inhibitor.

According to one embodiment of the present invention, this (co)polymer also comprises:
- at least one nonionic hydrophobic monomer having a polymerizable vinyl group,
- optionally a monomer having a polymerizable vinyl group and a hydrophobic hydrocarbon chain at least in $C_{10}$, preferably from $C_{12}$ to $C_{36}$, optionally oxyalkylated, distinct from the monomer (b),
- optionally a cross-linking monomer and
- optionally another additional monomer, optionally nonionic, distinct from the monomer (b).

Definitions

In the description of the present invention, the term "ASE" is an abbreviation for "Alkali-Soluble Emulsion" and the term "HASE" is an abbreviation for "Hydrophobically-modified Alkali-Soluble Emulsion". HASE polymers may be obtained, for example, by polymerization in the presence of an anionic surface-active agent, of a (meth)acrylic acid monomer, of an alkyl (meth)acrylate monomer and of a hydrophobic monomer constituted of a long aliphatic chain.

In the description of the present invention, unless otherwise indicated, the percentages expressed represent percentages by weight and are expressed relative to the total weight of the reference element. For example, when it is indicated that a (co)polymer comprises 10% of a monomer or of a reagent, it is understood that the polymer comprises 10% by weight of this monomer or reagent relative to the total weight of this polymer.

In the description of the present invention, the expression "at least one" designates one or more compound(s).

In the rest of the text, the expressions "between . . . and . . . ", "ranging from . . . to . . . " and "varying from . . . to . . . " are equivalent and are intended to mean that the limits are included, unless otherwise mentioned.

Unless otherwise indicated, the expression "comprising a(n)" should be understood as "comprising at least one".

DETAILED DESCRIPTION OF THE INVENTION

The present invention uses oligomers of acrylic acid represented by the formula (I):

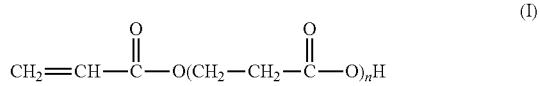
(I)

according to which n is an integer of between 1 and 10 (inclusive).

More precisely, these oligomers are in the form of a mixture of acidic compounds of formula (I) of chain lengths differing as a function of the value of n, for example comprising the acrylic acid dimer (also known as 3-(acryloyloxy)propionic acid, n=1), the acrylic acid trimer (n=2), the acrylic acid tetramer (n=3), etc. The mixture may also contain unreacted acrylic acid (formula (I) in which n=0).

As regards the mixture of oligomeric species per se, it is possible to characterize it by a mean degree of oligomerization which corresponds to the mean number of oligomeric species in the mixture. This mean degree of oligomerization may especially be determined by measuring the acid number of the mixture. The acid number (AN in meq. of acid per gram) may be determined by a potentiometric assay. The mean oligomerization number N is determined by means of the acid number AN according to the formula:

$$N = -1.443 \ln(AN) + 3.7946$$

The mean degree of oligomerization of the mixture of acrylic acid oligomeric species is a decimal number of between 0.1 and 10, for example between 0.1 and 3 for a product constituted essentially of a fraction rich in dimers and trimers or, for example, between 3 to 10 for a product which essentially contains oligomers of formula (I) with n>2. According to one embodiment, for each polymeric species of the mixture, n in formula (I) above is an integer of between 1 and 10, for example of between 1 and 6 or between 1 and 4.

In the rest of the presentation, the names used are as follows:
- di-AA: acrylic acid dimer,
- tri-AA: acrylic acid trimer and
- oligo-AA: the oligomeric species for which n>2 in formula (I).

The mixture of oligomers of acrylic acid represented by the formula (I) may contain from 10 ppm to 2,000 ppm of polymerization inhibitors, for example from 50 ppm to 2,000 ppm or from 100 ppm to 1,000 ppm, or else from 200 ppm to 500 ppm of polymerization inhibitors based on the total weight of the mixture.

It may prove to be useful to dilute this mixture of oligomers with a solvent, for example water, before use in the method of the present invention. The mixture is then in the form of an aqueous solution. The concentration of this aqueous solution of oligomers of acrylic acid may vary. For example, this concentration varies between 20% and 50% by weight of oligomers.

These oligomers of acrylic acid are prepared from acrylic acid at a temperature of between 50° C. and 200° C. in the presence of a basic or acid catalyst, of water and of polymerization inhibitors.

The method for preparing the mixture of oligomers of acrylic acid, in the presence of water, under these reaction conditions makes it possible, effectively, to obtain high yields of di-AA dimers and tri-AA trimers, for example greater than 20% by weight. It also makes it possible to limit the content of derived compounds (for example 3-HPA) in the mixture of oligomers obtained. Moreover, this method makes it possible to limit the amount of polymerization inhibitors, which facilitates the use in methods in which the oligomers are (co)polymerized in aqueous emulsion, for example to prepare a copolymer of ASE or HASE type. It has in fact been found that the presence of a small amount of water in combination with a basic or acid catalyst makes it possible to reduce the consumption of polymerization inhibitors in the course of the method for preparing oligomers of acrylic acid.

The acrylic acid used to prepare these oligomers may be of petrochemical origin or at least partly of renewable origin.

In the course of the method for preparing the oligomers, a temperature of between 50° C. and 200° C., for example of between 80° C. and 140° C. or between 90° C. and 120° C., is used. The method for preparing the oligomers uses a basic or acid catalyst. When it is acidic, said catalyst for synthesizing said oligomer of acrylic acid may be a homogeneous acid catalyst chosen from the group consisting of methanesulfonic acid, para-toluenesulfonic acid, benzenesulfonic acid, dodecylsulfonic acid, xylenesulfonic acid, sulfuric acid and a mixture of at least two of these catalysts. Alternatively, said acid catalyst for synthesizing said oligomer of acrylic acid may be a heterogeneous acid catalyst selected from the group consisting of ion-exchange resins and acidic zeolites.

The method for preparing the oligomers also uses water. According to one embodiment, the reaction medium contains an amount of water based on the total weight of acrylic acid used in the method of between 0.01% and 20% by weight, for example between 0.1% and 5% by weight or between 0.5% and 3% by weight based on the total weight of acrylic acid monomers.

Also, the method for preparing the oligomers uses at least one polymerization inhibitor. According to one embodiment, the reaction medium contains a small amount of polymerization inhibitors based on the total weight of acrylic acid used in the method. The term "small amount of polymerization inhibitors" means that the amount of polymerization inhibitors used is between 10 ppm and 2,000 ppm, for example from 50 ppm to 2000 ppm or from 100 ppm to 1000 ppm or else from 200 ppm to 500 ppm of polymerization inhibitors based on the weight of the acrylic acid monomers.

Preferably, the amount of polymerization inhibitors used in the method for preparing the oligomers is identical to that measured in the reaction product, i.e. the polymerization inhibitors are not consumed in the course of the method.

The polymerization inhibitor may be selected from the group consisting of phenothiazine, hydroquinone, hydroquinone monomethyl ether, hindered phenols such as di-tert-butyl-para-cresol (BHT), tert-butylhydroxyanisole (BHA) or di-tert-butylcatechol, para-phenylenediamine, TEMPO (2,2,6,6-tetramethyl-1-piperidinyloxy), TEMPO derivatives such as OH-TEMPO and a mixture of at least two of these inhibitors. According to one embodiment, two different inhibitors are used in the course of the method for preparing the oligomers, in particular the combination:
  of a polymerization inhibitor of phenolic type, for example hydroquinone or hydroquinone monomethyl ether, in a content ranging from 10 ppm to 2,000 ppm or from 100 ppm to 1,000 ppm and
  with a nitrogen-based polymerization inhibitor of TEMPO type or a TEMPO derivative in a content ranging from 1 ppm to 200 ppm, for example from 10 ppm to 60 ppm.

The thermal acrylic acid oligomerization reaction takes place with a controlled injection of oxygen-depleted air when the polymerization inhibitors are phenolic compounds. The thermal reaction time is generally of between 1 hour and 20 hours.

The oligomers of acrylic acid are represented by the formula (I):

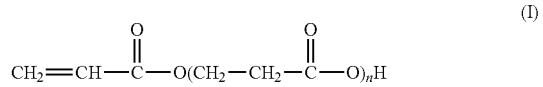

according to which n is an integer of between 1 and 10 (inclusive).

The mixture of oligomers may also comprise free acrylic acid in mass proportions that may range from 10/99 to 99/1 (expressed as oligomer/acid mass proportion).

According to one embodiment, the mixture of oligomers of acrylic acid comprises free acrylic acid in mass proportions that may range from 20/99 to 99/1 (expressed as oligomer/acid mass proportion).

According to one embodiment, the method for preparing the oligomers also comprises a purification step using at least one distillation column to remove the residual water and/or acrylic acid.

According to one embodiment, the mixture of oligomers of acrylic acid used in the context of the present invention is characterized in that:
  the content of di-AA and tri-AA is greater than 20% by weight, for example greater than 22% or 24% by weight, based on the total weight of the oligomers of the mixture and
  the content of residual acrylic acid is less than 60% by weight, for example less than 40% or 20% or 10% by weight, based on the total weight of the oligomers of the mixture.

Aqueous Emulsion Radical (Co)Polymerization Method

The present invention relates to a method of aqueous emulsion radical (co)polymerization of at least one mixture of oligomers of acrylic acid represented by the formula (I):

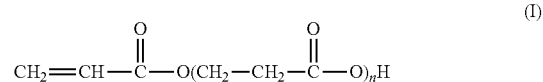

according to which n is an integer of between 1 and 10 (inclusive),
said oligomers being prepared from acrylic acid at a temperature of between 50° C. and 200° C. in the presence of a basic or acid catalyst, of water and of at least one polymerization inhibitor.

The emulsion polymerization (or copolymerization) according to the present invention is carried out in an aqueous medium. If necessary, said mixture of oligomers of acrylic acid may be diluted before being used in the method of the present invention. Thus, said mixture may be in the form of an aqueous solution.

Such an aqueous emulsion (co)polymerization method uses at least one polymerization initiator, at least one surface-active agent and optionally at least one chain-transfer agent. According to one embodiment, the polymerization initiator is a persulfate salt, for example ammonium persulfate or sodium persulfate.

The emulsion radical polymerization is carried out in the presence of at least one surface-active agent, and optionally of at least one chain-transfer agent, for regulating the molecular mass of the chains produced during the polymerization.

As surface-active agents that may be used, mention may be made of:
  anionic surfactants such as a fatty acid salt, an alkyl sulfate salt (for instance sodium lauryl sulfate), an alkyl ether sulfate salt (for instance sodium lauryl ether sulfate), an alkylbenzene sulfate salt (for instance sodium dodecylbenzenesulfonate), an alkyl phosphate salt or a sulfosuccinate diester salt,
  nonionic surfactants such as a polyoxyethylene alkyl ether or a polyoxyethylene fatty acid ester,
  cationic surfactants such as quaternary alkyl- and/or aryl-ammonium halides and
  zwitterionic or amphoteric surfactants such as surfactants comprising a betaine group.

As chain-transfer agents that may be used, mention may be made of mercaptan compounds comprising at least four carbon atoms, such as butyl mercaptan, n-octyl mercaptan, n-dodecyl mercaptan or tert-dodecyl mercaptan.

According to one embodiment of the present invention, the method comprising copolymerizing in an aqueous emulsion:

(a) said oligomers of acrylic acid of formula (I):

$$CH_2=CH-\overset{O}{\overset{\|}{C}}-O(CH_2-CH_2-\overset{O}{\overset{\|}{C}}-O)_nH \quad (I)$$

according to which n is an integer of between 1 and 10 (inclusive), (b) at least one nonionic hydrophobic monomer having a polymerizable vinyl group,
(c) optionally at least one monomer having a polymerizable vinyl group and a hydrophobic hydrocarbon chain at least in $C_{10}$, preferably from $C_{12}$ to $C_{36}$, optionally oxyalkylated, distinct from the monomer (b),
(d) optionally at least one cross-linking monomer and
(e) optionally at least one other additional monomer, optionally nonionic, distinct from the monomer (b).

According to one embodiment, said nonionic hydrophobic monomer(s) (b) are chosen from among acrylic esters, for example chosen from among C1-C8 alkyl acrylates or C1-C8 alkyl methacrylates such as methyl acrylate, ethyl acrylate, butyl acrylate, 2-ethylhexyl acrylate, methyl methacrylate, ethyl methacrylate, butyl methacrylate and their mixtures.

Said nonionic hydrophobic monomer(s) (b) may represent from 45% to 75% by weight, in particular from 48% to 68% by weight and more particularly from 50% to 64% by weight based on the total weight of monomers forming the polymer.

According to one embodiment, said monomer(s) (c) are of formula (II):

$$T-A-Z \quad (II)$$

in which:
T represents a polymerizable group allowing the copolymerization of the monomer (c),
A represents a polymeric chain constituted of:
  m units of alkylene oxide of formula —$CH_2CHR_1O$— with $R_1$ representing an alkyl group comprising from 1 to 4 carbons, for example an ethyl or methyl group, and m varying from 0 to 150,
  p units of alkylene oxide of formula —$CH_2CHR_2O$— with $R_2$ representing an alkyl group comprising from 1 to 4 carbons, for example an ethyl or methyl group, and p varying from 0 to 150 and
  n units of ethylene oxide with n varying from 0 to 150, or from 10 or 15 to 150, or from 10 or 15 to 100, or from 15 to 50, or from 15 to 30,
  in which the alkylene oxide units of formula —$CH_2CHR_1O$—, the alkylene oxide units of formula —$CH_2CHR_2O$— and the ethylene oxide units are arranged in blocks, alternating or random and
Z represents a polycyclic or cyclic, branched, linear, saturated or unsaturated, fatty chain of at least 10 carbon atoms, optionally comprising one or several heteroatom(s) such as, for example, O, S, N or P.

According to one embodiment, said monomer(s) (c) represent from 0% to 20% by weight, for example from 2% to 15% by weight or from 4% to 10% by weight based on the total weight of monomers forming the polymer.

The term "fatty chain" means an aliphatic hydrocarbon chain of a polycyclic or cyclic, branched, linear fatty acid comprising at least 10 carbon atoms, for example from 12 to 36 carbon atoms, optionally comprising one or several heteroatom(s) such as, for example, O, S, N or P.

According to one embodiment, the chain Z is a branched chain comprising 16 carbon atoms.

The end T more particularly represents a radical containing a polymerizable unsaturated group belonging to the group of acrylic, methacrylic, maleic, itaconic or crotonic esters. The end T may be chosen especially from acrylate, methacrylate, allylic, vinyl, methacrylurethane and alpha, alpha-dimethyl-m-isopropenyl benzyl urethane groups.

According to one embodiment, the monomer (c) corresponds to the formula (III) below:

$$CH_2=C(R_1)-COO-A-Z \quad (III)$$

in which:
$R_1$ represents H or $CH_3$ and
A and Z have the same definition as in formula (II) above.

According to a particular embodiment, A in the above-mentioned formulae (II) and (III) represents a polymeric chain constituted of from 15 to 150 ethylene oxide units, in particular from 15 to 50 ethylene oxide units and especially from 15 to 30 ethylene oxide units.

As examples, the monomer (c) may correspond to formula (II) or (III) in which A and Z are such that:
  m and p are zero, n is 25, $R_1$ represents $CH_3$, Z is a branched chain comprising 16 carbon atoms, namely 2-hexyl-1-decyl,
  m and p are zero, n is 25, $R_1$ represents $CH_3$, Z is a branched chain comprising 32 carbon atoms,
  m and p are zero, n is 25, $R_1$ represents $CH_3$, Z is a linear chain comprising 22 carbon atoms,
  m and p are zero, n is 36, $R_1$ represents $CH_3$, Z is a branched chain comprising 20 carbon atoms, namely 2-octyl-1-dodecyl or
  m and p are zero, n is 30, $R_1$ represents $CH_3$, Z is an oxo chain comprising 12 carbon atoms.

According to one embodiment, said cross-linking monomer(s) (d) are chosen from the group consisting of trimethylolpropane tri(meth)acrylate, ethoxylated trimethylolpropane tri(meth)acrylate, ethylene glycol di(meth)acrylate, methylenebisacrylamide, triallyl cyanurate, diallyl phthalate, diallyl maleate, ethylene glycol dicyclopentenyl ether methacrylate, ethylene glycol dicyclopentenyl ether acrylate, dicyclopentenyl ether acrylate and their mixtures.

According to this embodiment, said cross-linking monomer(s) (d) represent less than 8% by weight, for example less than 5% or less than 2% by weight, based on the total weight of monomers forming the polymer.

According to one embodiment, the aqueous emulsion radical polymerization method uses one or several additional monomers (e) which may be chosen especially from among:
  2-acrylamido-2-methylpropanesulfonic acid (AMPS),
  the monomers of formula (e1):

$$\underset{R_c}{\overset{R_a}{\diagdown}}C=C\underset{(CH_2)_n-OH}{\overset{R_b}{\diagup}} \quad (e1)$$

in which:
 $R_a$, $R_b$ and $R_c$ represent, independently of one another, H or $CH_3$ and
 n is an integer equal to 1 or to 2 and
the monomers of formula (e2):

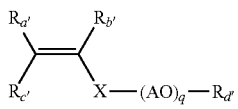
(e2)

in which:
 $R_{a'}$, $R_{b'}$, $R_{c'}$ and $R_{d'}$ represent, independently of one another, H or $CH_3$,
 X represents (C=O) or $(CH_2)_r$ with r=0, 1 or 2,
 (AO) represents a polyalkoxylated chain constituted of alkoxylated units, arranged in blocks, alternating or random, chosen from among the ethoxylated units EO, the propoxylated units PO and the butoxylated units BO and
 q is equal to 0 or represents an integer varying from 1 to 150.

It is understood that the various particular embodiments described for each of the nonionic hydrophobic monomers, cross-linking monomers, monomers having a polymerizable vinyl group and a hydrophobic hydrocarbon chain and optionally nonionic additional monomers of the polymer according to the invention may be combined.

Said optionally nonionic additional monomer(s) (e) may represent less than 50% by weight, in particular less than 40% by weight and more particularly from 1% to 30% by weight based on the total weight of monomers forming the copolymer according to the invention.

Associative Acrylic (Co)Polymer Comprising at Least One Mixture of Oligomers of Acrylic Acid The present invention also relates to an associative acrylic (co)polymer comprising at least one mixture of oligomers of acrylic acid as described previously, i.e. represented by the formula (I):

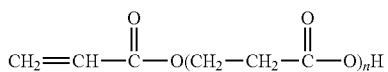
(I)

according to which n is an integer of between 1 and 10 (inclusive),
said oligomers being prepared from acrylic acid at a temperature of between 50° C. and 200° C. in the presence of a basic or acid catalyst, of water and of at least one polymerization inhibitor.

The term "comprising" means that said (co)polymer results from the polymerization of the monomers that follow.

Preferably, the invention provides an associative acrylic (co)polymer comprising at least one mixture of oligomers of acrylic acid, represented by the formula (I) and comprising from 200 ppm to 500 ppm of at least one polymerization inhibitor:

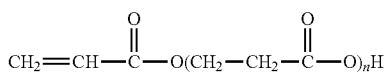
(I)

according to which n is an integer of between 1 and 10 (inclusive), said oligomers being prepared from acrylic acid at a temperature of between 50° C. and 200° C. in the presence of a basic or acid catalyst, of water and of at least one polymerization inhibitor.

According to one embodiment of the present invention, said (co)polymer comprises:
 (a) said oligomers of acrylic acid of formula (I):

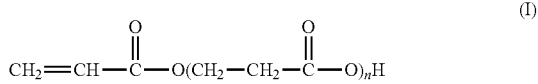
(I)

according to which n is an integer of between 1 and 10 (inclusive),
 (b) at least one nonionic hydrophobic monomer having a polymerizable vinyl group,
 (c) optionally a monomer having a polymerizable vinyl group and a hydrophobic hydrocarbon chain at least in $C_{10}$, preferably from $C_{12}$ to $C_{36}$, optionally oxyalkylated, distinct from the monomer (b),
 (d) optionally a cross-linking monomer and
 (e) optionally another additional monomer, optionally nonionic, distinct from the monomer (b).

According to a preferred embodiment of the present invention, said copolymer is constituted of:
 (a) at least one mixture of oligomers of acrylic acid of formula (I) comprising from 200 ppm to 500 ppm of at least one polymerization inhibitor:

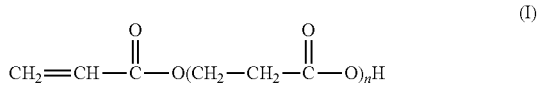
(I)

according to which n is an integer of between 1 and 10 (inclusive),
 (b) ethyl acrylate as nonionic hydrophobic monomer having a polymerizable vinyl group,
 (c) optionally a monomer having a polymerizable vinyl group and a hydrophobic hydrocarbon chain at least in $C_{10}$, preferably from $C_{12}$ to $C_{36}$, optionally oxyalkylated, distinct from the monomer (b).

According to one variant of this embodiment, said copolymer results from the polymerization of monomers (a) and of monomers (b) exclusively. In other words, said copolymer is of "Alkali-Soluble Emulsion" type or ASE.

According to another variant of this embodiment, said copolymer consists of:
 (a) from 1% to 99% by weight of oligomers of acrylic acid of formula (I):

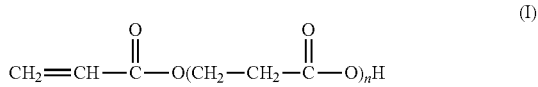
(I)

according to which n is an integer of between 1 and 10 (inclusive) and
 (b) from 1% to 99% by weight of at least one nonionic hydrophobic monomer having a polymerizable vinyl group, for example chosen from among acrylic esters or, for example, chosen from the group consisting of $C_1$-$C_8$ alkyl acrylates and $C_1$-$C_8$ alkyl methacrylates. The monomer may be chosen, for example, from the group consisting of methyl acrylate, ethyl acrylate, butyl acrylate, 2-ethylhexyl acrylate, methyl methacrylate, ethyl methacrylate, butyl methacrylate and their mixtures.

According to another embodiment of the present invention, said copolymer comprises:
(a) said oligomers of acrylic acid of formula (I):

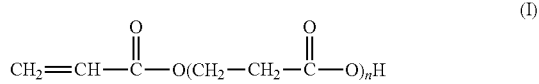

according to which n is an integer of between 1 and 10 (inclusive),
(b) at least one nonionic hydrophobic monomer having a polymerizable vinyl group,
(c) at least one monomer having a polymerizable vinyl group and a hydrophobic hydrocarbon chain at least in $C_{10}$, preferably from $C_{12}$ to $C_{36}$, optionally oxyalkylated, distinct from the monomer (b),
(d) optionally a cross-linking monomer and
(e) optionally another additional monomer, optionally nonionic, distinct from the monomer (b).

According to this embodiment, said copolymer is of HASE type, i.e. it comprises monomers of associative type allowing thickening of associative type when it is used in a formulation.

The definitions and technical characteristics of the various monomers used in the method of the present invention are moreover reproduced identically as regards the definition of the associative acrylic (co)polymer and may be combined.

Use of the (Co)Polymers According to the Invention and Formulations Containing them The associative acrylic (co)polymers may be used as thickener for optionally pigmented aqueous formulations.

One subject of the present invention also relates to an optionally pigmented aqueous formulation containing the (co)polymer described previously. This aqueous formulation may be chosen from water-based paints, dispersions, varnishes, paper coating colours, cosmetic formulations, detergent formulations, textile formulations, drilling muds, joint compound formulations for plaster boards, formulations for ceramic, formulations for leather, plaster formulations or formulations for hydraulic binders such as mortar formulations.

EXAMPLES

Example 1 (Outside the Invention)

Synthesis of a Polymer of HASE Type in a Semi-Batch Method

The protocol for synthesizing the polymer produced in semi-batch mode is as follows: 252 g of deionized water and 3.5 g of Sodium Dodecyl Sulfate (SDS) are placed in a 1 L reactor, stirred and heated by means of an oil bath.

The premix comprising the following ingredients is prepared in a beaker:
ethyl acrylate: 179.9 g,
Sipomer® B-CEA oligomers of acrylic acid: 82.3 g,
macromonomer noted as monomer MA (c) of formula (II) in which m and p are zero, n is 25, T represents $CH_2$=$C(CH_3)$—COO, Z is a branched chain comprising 16 carbon atoms, namely 2-hexyldecyl 43.8 g,
N-dodecyl mercaptan: 0.64 g,
deionized water: 290.9 g and
SDS: 3.5 g.

This premix is stirred so as to form an emulsion.

A solution constituted of 0.55 g of ammonium persulfate and 74.5 g of water is prepared. This solution of polymerization initiators is injected into the reactor over 2 hours and the monomer premix is injected in parallel over 2 hours.

18 g of water are then added.

The mixture is heated again for 1 hour at a temperature of 86° C.±2° C. 0.27 g of ammonium persulfate and 16 g of deionized water are then added.

The mixture is then cooled to room temperature.

Results: delay of polymerization, accumulation of monomers, strong exothermicity Example 2 (According to the Invention)

Example 1 is reproduced identically, except for the fact that the 82.3 g of Sipomer® oligomers of acrylic acid are replaced with 91.5 g of oligomers of acrylic acid prepared according to the following method:

The following were introduced into a perfectly stirred three-necked reactor, equipped with a temperature probe and on which was mounted a condenser:
200 g of acrylic acid,
200 ppm of HydroQuinone Methyl Ether (HQME),
1% of water and
20% of Amberlyst A16 resin.

The reaction medium was stirred for 8 hours at 97° C. while sparging with air.

After 8 hours, the reaction medium comprises the same amount of HQME.
Characteristics of the Copolymer of HASE Type Obtained:
SC: 30.1%
Particle diameters (nm): 350
Residual AA: 210 ppm
Residual EA: 310 ppm

The invention claimed is:
1. A method for synthesizing an acrylic (co)polymer, the method comprising:
(co)polymerizing a mixture comprising
a. at least one oligomer of acrylic acid represented by formula (I):

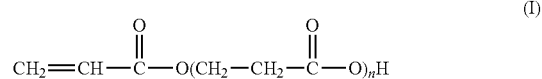

where n is an integer of from 1 to 10, in an aqueous emulsion radical (co)polymerization,
wherein the at least one oligomer is prepared from acrylic acid at a temperature of between 90° C. and 120° C. in the presence of a basic or acid catalyst, a reaction medium containing between 0.01% and 20% by weight water based on a total weight of acrylic acid monomers, and at least one polymerization inhibitor, and
wherein said mixture comprises a mixture of oligomers having an acrylic acid dimer and trimer content greater than 20% by weight and a residual acrylic acid content less than 60% by weight based on the total weight of the oligomers of the mixture, and from 10 ppm to 2,000 ppm of the polymerization inhibitors based on a total weight of the mixture.

2. The method according to claim 1, wherein the mixture further comprises
   b) at least one nonionic hydrophobic monomer having a polymerizable vinyl group,
   c) optionally at least one monomer, which is distinct from the monomer (b), has a polymerizable vinyl group and a hydrophobic hydrocarbon chain containing at least 10 carbon atoms, and is optionally oxyalkylated,
   d) optionally at least one cross-linking monomer, and
   e) optionally at least one other additional monomer, which is distinct from the monomer (b) and optionally nonionic.

3. The method according to claim 2, wherein the nonionic hydrophobic monomer (b) is selected from the group consisting of $C_1$-$C_8$ alkyl acrylate, a $C_1$-$C_8$ methacrylate, and a mixture thereof.

4. The method according to claim 2 wherein the mixture comprises the cross-linking monomer (d) which is selected from the group consisting of trimethylolpropane tri(meth)acrylate, ethoxylated trimethylolpropane tri(meth)acrylate, ethylene glycol di(meth)acrylate, methylenebisacrylamide, triallylcyanurate, diallylphtalate, diallylmaleate, ethylene glycol dicyclopentenyl ether methacrylate, ethylene glycol dicyclopentenyl ether acrylate, dicyclopentenyl ether acrylate and a mixture thereof.

5. The method according to claim 2, wherein the mixture comprises the monomer (c) which is represented by formula (II):

where:
   T represents a polymerizable group,
   A represents a polymeric chain of:
      m units of alkylene oxide of formula -$CH_2CHR_1O$- with $R_1$ representing an alkyl group comprising from 1 to 4 carbons, and m varying from 0 to 150,
      p units of alkylene oxide of formula -$CH_2CHR_2O$- with $R_2$ representing an alkyl group comprising from 1 to 4 carbons, and p varying from 0 to 150 and
      n units of ethylene oxide with n varying from 0 to 150, in which the alkylene oxide units of formula -$CH_2CHR_1O$-, the alkylene oxide units of formula -$CH_2CHR_2O$- and the ethylene oxide units are arranged in alternating or random blocks and
   Z represents a polycyclic or cyclic, branched, linear, saturated or unsaturated, fatty chain of at least 10 carbon atoms, optionally comprising one or more heteroatoms.

6. The method according to claim 2, wherein the mixture comprises the additional monomer (e), which is selected from group consisting of:
   2-acrylamido-2-methylpropanesulfonic acid (AMPS),
   a monomer of formula (e1):

in which:
   $R_a$, $R_b$ and $R_c$ represent, independently of one another, H or $CH_3$ and
   n is an integer of 1 or 2 and
a monomer of formula (e2):

in which:
   $R_{a'}$, $R_{b'}$, $R_{c'}$ and $R_{d'}$ represent, independently of one another, H or $CH_3$,
   X represents (C=O) or $(CH_2)_r$ with r=0, 1 or 2,
   (AO) represents a polyalkoxylated chain of alkoxylated units, which are arranged in alternating or random blocks, and selected from the group consisting of ethoxylated units EO, propoxylated units PO and butoxylated units BO and
   q is equal to 0 or an integer varying from 1 to 150.

7. The method according to claim 2 wherein the mixture further comprises:
   at least one polymerization initiator,
   at least one surface-active agent and
   optionally at least one chain transfer agent.

8. An associative acrylic (co)polymer synthesized by the method of claim 1.

9. The (co)polymer according to claim 8, further comprising:
   b) ethyl acrylate as a nonionic hydrophobic monomer having a polymerizable vinyl group, and
   c) optionally one monomer, which is distinct from (b) has a polymerizable vinyl group and a hydrophobic hydrocarbon chain containing at least 10 carbon atoms, and is optionally oxyalkylated.

* * * * *